United States Patent
Grangeon et al.

[11] Patent Number: 5,873,998
[45] Date of Patent: Feb. 23, 1999

[54] INORGANIC TUBULAR FILTER ELEMENT INCLUDING CHANNELS OF NON-CIRCULAR SECTION HAVING OPTIMIZED PROFILE

[75] Inventors: André Grangeon, Valreas; Philippe Lescoche, Favcon, both of France

[73] Assignee: Société Anonyme: T.A.M.I. Industries, Nyons, France

[21] Appl. No.: 759,426

[22] Filed: Dec. 5, 1996

[30] Foreign Application Priority Data

Dec. 5, 1995 [FR] France .................................... 95 14517

[51] Int. Cl.$^6$ ..................................................... B01D 63/06
[52] U.S. Cl. ................................. 210/321.78; 210/321.87; 210/321.89; 210/510.1; 96/4; 96/9; 96/12
[58] Field of Search .................................... 96/4, 7, 9, 12; 210/321.78, 321.8, 321.87, 321.89, 510.1

[56] References Cited

U.S. PATENT DOCUMENTS 4,222,874  9/1980  Connelly .
4,358,428  11/1982  Fujita et al. .

FOREIGN PATENT DOCUMENTS 0 352 015 A1  1/1990  European Pat. Off. .
3501941 A1  7/1986  Germany .

WO 93/07959  10/1992  WIPO .

*Primary Examiner*—W. L. Walker
*Attorney, Agent, or Firm*—Bacon & Thomas, PLLC

[57] ABSTRACT

The invention relates to an inorganic filter element comprising:

a rigid inorganic porous support; and channels classifiable into $\underline{n}$ categories where $n \geq 2$, with all of the channels in each category having identical right cross-section, identical hydraulic diameter, and identical equivalent diameter, the shapes of the right cross-sections of the channels differing between categories.

According to the invention, the channels of the various categories have:

hydraulic diameters such that the ratios between any two hydraulic diameters lie in the range 0.75 to 1.3;

right cross-sectional areas such that the ratios between any two right cross-sectional areas lie in the range 0.75 to 1.3; and equivalent diameters such that the ratio of the equivalent diameter over the hydraulic diameter of each channel is less than or equal to 2.

6 Claims, 1 Drawing Sheet

INORGANIC TUBULAR FILTER ELEMENT INCLUDING CHANNELS OF NON-CIRCULAR SECTION HAVING OPTIMIZED PROFILE

FIELD OF THE INVENTION

The present invention relates to the technical field of molecular or particulate separation by implementing separator elements, generally referred to as "membranes" and made up of inorganic materials.

More precisely, the invention seeks to make an inorganic filter element that is generally tubular in shape suitable for concentrating, sorting, or extracting molecular or particulate species contained in a fluid medium exerting a given pressure on the membrane.

A particularly advantageous application of the invention lies in the field of nanofiltration, ultra-filtration, microfiltration, filtration, or reverse osmosis.

BACKGROUND OF THE INVENTION

In the state of the art, numerous membranes are known that are made from tubular filter elements. Thus, a filter element of the multichannel type is known that includes a rigid porous support of elongate shape having a right cross-section that is polygonal or circular. The porous support, which is made of ceramics for example, is organized to include a series of channels that are parallel to one another and to the longitudinal axis of the porous support, each having a right cross-section that is circular. The surfaces of the channels are covered in at least one separator layer of nature and morphology adapted to separate molecules or particles contained in the liquid medium flowing inside the channels. By the sieve effect, such a membrane separates out the molecular or particulate species of the substance to be treated insofar as all molecules or particles of diameter greater than the diameter of the pores in the membrane are stopped. During separation, fluid transfer takes place through the separator layer(s), after which the fluid spreads out within the pores of the support and travels towards the outside surface of the porous support.

A major drawback of such multichannel filter elements lies in the resulting low flow rate of filtrate. The path which the filtrate must follow before reaching the outside surface of the support, when starting from the channels situated in the central portion of the support, is much longer than the path that needs to be followed from the other channels, in particular from the peripheral channels. Also, filtrates coming from channels in the central region of the support encounter filtrates coming from other channels. That is why headloss appears in the transfer of filtrate towards the outside surface of the support. This headloss opposes the transfer pressure and reduces the flow speed.

In an attempt to remedy the above drawback, patent application WO 93/07959 proposes a tubular filter element each of whose channels is of non-circular right cross-section. In a first embodiment, the filter element comprises an inorganic porous support in which the channels are formed parallel to the central axis of the support, being disposed substantially in a circle that is coaxial with the central axis. In right cross-section, each channel has a peripheral wall directed towards the outside surface of the support and co-operating therewith to define a passage of constant thickness through which filtrate is conveyed. Each peripheral wall is extended at both ends by radial walls that are connected together, and each of which co-operates with the facing radial wall of an adjacent channel to form a partition. The profile of the channels is selected in such a manner as to leave wedge-shaped partitions that flare towards the outside of the substrate. In a second embodiment, the axes of the channels are situated either on a plurality of circles that are coaxial about the axis of the support, or else in a plurality of layers that are parallel to one another and to the axis of the support. In that second embodiment, adjacent channels between two layers leave a partition that flares likewise towards the outside of the substrate. It can thus be seen that the wedge shape of the partitions defined between the radial walls facilitates transfer of permeate towards the outside surface of the support.

It also appears that by making channels that are not circular in section, such an element makes it possible to increase the ratio of filter area over the volume of porous support used. Nevertheless, it must be observed that such an element suffers from a major difficultly of implementation. In order to better occupy the section of the porous support so as to increase filter area, the above-specified patent application describes, in FIG. 3 thereof, a variant embodiment in which the channels can be classified in three different categories. The channels of the first category have their axes situated on a circle that is coaxial about the central axis of the support. All of those channels present both a right cross-section that is identical and can be referred to as pentagonal, and a hydraulic diameter that is identical. Given the non-circular shape of the channels, the diameter of each channel is defined by its hydraulic diameter $\phi h$ such that $\phi h=4. S/P$ where S is the section of the channel and P is the perimeter of the channel. The channels of the second category have their axes situated on a circle that is coaxial about the central axis of the support but that is situated inside the circle on which there are situated the axes of the channels of the first category. All of the channels of the second category have both identical right cross-section that can be referred to as triangular, and also identical hydraulic diameter. A third category comprises a channel of circular section centered on the central axis of the porous support.

An examination of that type of element has led to the observation that the right cross-sections of the channels are different for the three categories of channel. As a result, the speed of fluid flow in the channels of the three categories is different since said speed is equal to the flow rate along the channel divided by the right cross-sectional area of the channel. Flow speed is one of the parameters contributing to the value of shear stress, which stress is created at the wall of the element because the element operates under cross-flow conditions. In theory, such operation favors unclogging of the surface of the filter element, due to the shear stress that removes deposited matter. In the filter element described above, cross-flow unclogging is not uniform in all of the channels because of their different flow speeds, thereby leading to misoperation of the filter element.

Also, the desire to optimize the ratio of filter area over the volume of the porous support used leads to making a filter element of the type described above in which the channels have hydraulic diameters of different values. In certain applications, in which the fluid to be treated is of a heterogeneous nature, it can be observed that channels of too small a hydraulic diameter become blocked.

Although making a filter element having channels of non-circular section presents an undeniable advantage with respect to increase in filter area over volume of the porous support used, it must be observed that there remains a problem in defining the dimensions and the shape of the channels in order to avoid non-uniform unclogging between the channels and blocking of some of the channels by the fluid to be treated.

There is thus a need to define characteristics for a filter element so that it is designed to optimize the ratio of the filter area over the volume of the porous support used while enabling uniform unclogging to be obtained in all of the channels and no obstruction of the channels by the fluid to be treated.

OBJECTS AND SUMMARY OF THE INVENTION

The invention seeks specifically to propose such an inorganic filter element that aims at satisfying the above-expressed need.

To achieve this object, the inorganic filter element for recovering a filtrate from a fluid medium comprises:

a rigid inorganic porous support of cylindrical shape having a longitudinal central axis; and channels formed in the support parallel to its central axis and each having its surface covered by at least one separator layer for coming into contact with the fluid medium, said channels being classifiable in $\underline{n}$ categories where $n \geq 2$, with all of the channels in each category having identical cross-sectional area, identical hydraulic diameter, and identical equivalent diameter, the shapes of the right cross-sections of the channels differing between categories.

According to the invention, the channels of the different categories present:

hydraulic diameters such that the ratios between any two hydraulic diameters lie within the range 0.75 to 1.3;

right cross-sectional areas such that the ratios between any two right cross-sectional areas lie in the range 0.75 to 1.3; and equivalent diameters such that the ratio of the equivalent diameter over the hydraulic diameter for each channel is less than or equal to 2.

BRIEF DESCRIPTION OF THE DRAWING

Various other characteristics appear from the following description given with reference to the accompanying drawing which shows, in non-limiting manner, embodiments implementing the subject matter of the invention.

MORE DETAILED DESCRIPTION

Figure 1:
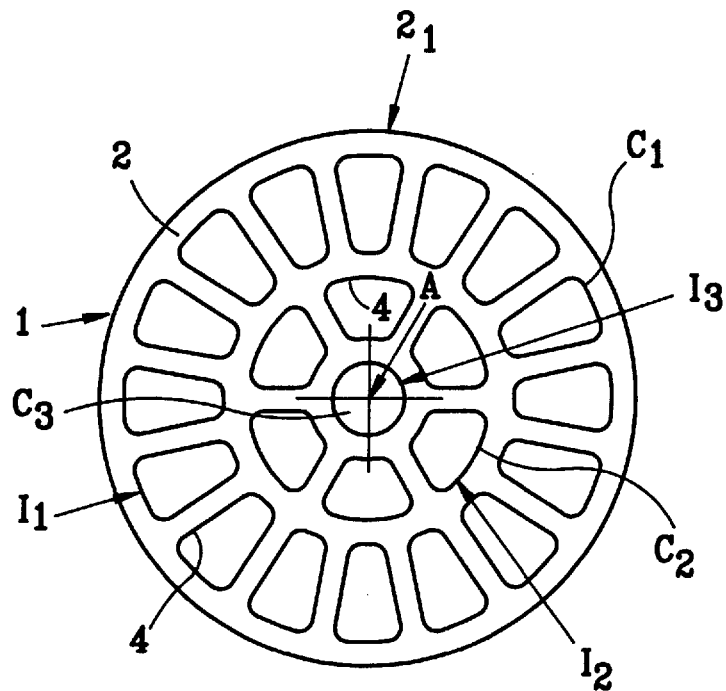
FIG. 1 is a cross-section through one embodiment of a filter element.

As can be seen in FIG. 1, the inorganic filter element 1 of the invention is adapted to separate or filter molecules or particles contained in various kinds of fluid medium, preferably a liquid, and optionally including a solid phase. The filter element 1 comprises a rigid inorganic porous support 2 made of a material whose transfer resistance is adapted to the separation that is to be performed. The support 2 is made of inorganic materials, such as metal oxides, carbon, or metals. The support 2 is generally made in elongate shape or in the form of a duct extending along a longitudinal central axis A. The porous support 2 possesses pores having a mean equivalent diameter lying in the range 2 $\mu$m to 12 $\mu$m, and preferably being about 5 $\mu$m. The right cross-section of the support 2 is hexagonal, or as in the example shown in FIG. 1, circular. The support 2 thus offers an outside surface $2_1$ that is cylindrical.

The support 2 is shaped to include a first category $I_1$ of channels $C_1$ extending parallel to the axis A of the support.

Each of the channels $C_1$ has a surface 4 covered in at least one separator layer (not shown) that is intended to come into contact with the fluid medium to be treated flowing within the channels $C_1$. The nature(s) of the separator layer(s) is/are chosen as a function of the separation or filtration power that is to be obtained and the layer(s) co-operate(s) with the support to form an intimate bond so that the pressure from the liquid medium is transmitted to the porous support 2. The layer(s) may be deposited, e.g. from suspensions containing at least one metal oxide and conventionally used in producing inorganic filter elements. After drying, the layer(s) is/are subjected to a sintering operation for consolidation and bonding purposes, both between layers and to the porous support 2.

The area $S_1$ of the right cross-section of all of the channels $C_1$ is the same. As a result, all of the channels $C_1$ have an equivalent diameter $\phi e_1$ of the same value, given that $\phi e_1 = (S_1 . 4\pi)^{1/2}$. Preferably, all of the channels $C_1$ have identical profile or shape. In addition, all of the channels $C_1$ possess identical hydraulic diameter $\phi h_1$. In the example shown in FIG. 1, the first category $I_1$ comprises sixteen "peripheral" channels $C_1$ whose centers lie on a circle coaxial about the central axis A. All of the channels $C_1$ have a right cross-section that is generally in the form of a quadrilateral.

In accordance with the invention, the filter element 1 includes at least one second category $I_2$ of channels $C_2$ each having its surface 4 covered in at least one separator layer as explained above. All of the channels $C_2$ have a right cross-section possessing an area $S_2$ of the same value. The channels $C_2$ thus all have an equivalent diameter $\phi e_2$ of the same value. Preferably, all of the channels $C_2$ are identical in profile or shape. Nevertheless, the shape of the right cross-section of the channels $C_2$ in the second category $I_2$ is different from the shape or profile of the right cross-section of the channels $C_1$ in the first category $I_1$. In addition, all of the channels $C_2$ possess an identical hydraulic diameter $\phi h_2$.

In the example shown in FIG. 1, the second category $I_2$ comprises six "internal" channels $C_2$ and their centers are situated on a circle that is coaxial about the central axis A, said coaxial circle presenting a diameter that is smaller than the diameter of the coaxial circle on which the centers of the channels $C_1$ are situated. In the example shown, all of the channels $C_2$ have a right cross-section that is generally trapezoidal in shape.

In accordance with the invention, the channels $C_1$ of the first category $I_1$ have a right cross-section of area $S_1$ which is substantially identical to the area $S_2$ of the right cross-section of the channels of the second category $I_2$. The areas $S_1$ and $S_2$ are considered as being substantially identical if the ratio $S_1/S_2$ (or $S_2/S_1$) lies in the range 0.75 to 1.3 and preferably in the range 0.95 to 1.05. Thus, in the example shown in FIG. 1, all of the channels $C_1$ have a right cross-section of area $S_1 = 12$ mm$^2$ while all of the channels $C_2$ have a right cross-section of area $S_2 = 10$ mm$^2$. The ratio $S_1/S_2 = 1.2$ or $S_2/S_1 = 0.83$ which is indeed in the range given above.

Insofar as all of the sections of channels $C_1$ and $C_2$ in the element are of areas $S_1$, $S_2$ that are substantially identical, the speed at which fluid flows within the channels is the same, thereby ensuring that crossflow unclogging is uniform regardless of which channel is taken in the filter element.

In accordance with the invention, the hydraulic diameter $\phi h_1$ of the channels $C_1$ of the first category $I_1$ is substantially identical to the hydraulic diameter $\phi h_2$ of the channels $C_2$ of the second category $I_2$. The diameters $\phi h_1$ and $\phi h_2$ are considered as being substantially identical if the ratio $\phi h_1/\phi h_2$ (or $\phi h_2/\phi h_1$) lies in the range 0.75 to 1.3, and preferably in the range 0.95 to 1.05. In the example shown in FIG. 1, the hydraulic diameter $\phi h_1=3.5$ mm and the hydraulic diameter $\phi h_2=3.5$ mm.

Insofar as all of the channels $C_1$, $C_2$ are of substantially identical hydraulic diameter, it is possible to make appropriate channels with a given hydraulic diameter for filtering a fluid that is not uniform, and may even be viscous and contain particles in suspension, without thereby blocking the channels.

According to the invention, the channels $C_1$ and $C_2$ need to satisfy an additional characteristic in order to avoid the channels becoming blocked when filtering a fluid of non-uniform character, i.e. containing particles in suspension. For example, consider a filter element that has a first series of channels of circular right cross-section and a second series of channels of rectangular section with one dimension being much smaller than the other dimension. Even though those two series of channels can indeed be designed to satisfy the above-defined conditions of hydraulic diameters and cross-sectional areas being substantially identical, it nevertheless turns out that the channels in the second series which define fluid flow in the form of liquid sheets are more likely to become blocked than the channels of the other series.

Thus, to avoid channels becoming blocked, the equivalent diameter of the channels must be such that the ratio of equivalent diameter over hydraulic diameter for each channel is less than or equal to 2. Thus, the ratios $\phi e_1/\phi h_1$ for the channels $C_1$ of the first category and $\phi e_2/\phi h_2$ for the channels $C_2$ of the second category must both be less than or equal to 2. The ratio of equivalent diameter over hydraulic diameter defines departure from circularity of the channels. If the ratio is 1, then the channel is circular. The further this ratio is from 1, then the further the shape of the channel from that of a circle. Thus, when this ratio is high, either the shape of the channel possesses one dimension that is very large compared with its other dimension (a sheet of liquid), or else the channel is star-shaped possessing nsides (with n>4 or 5). Whatever the shape of the channels, removal of filtrate through the pores of the support 2 is slowed down by the existence of a high ratio of equivalent diameter over hydraulic diameter since the path followed by the filtrate to the outside surface $2_1$ of the element is necessarily lengthened. It has been observed that if the ratio of equivalent diameter over hydraulic diameter is greater than 2, then filtrate flow rate is reduced, thereby giving rise to a drop in permeability.

Thus, complying with this "circularity" characteristic serves to prevent the channels becoming blocked whatever their shape, while avoiding any reduction in filtrate flow rate. In the example shown, the "circularity" ratios of the first and second categories of channels $C_1$ and $C_2$ are respectively equal to 1.11 ($\phi e_1/\phi h_1$) and to 1.02 ($\phi e_2/\phi h_2$) where $\phi e_1=3.9$ mm and $\phi e_2=3.56$ mm.

In the example shown in FIG. 1, the filter element 1 of the invention includes a third category $I_3$ of channels $C_3$ each having its surface covered in at least one separator layer. The channels $C_3$ of this third category all have a right cross-section $S_3$ of identical area. The channels $C_3$ all have the same equivalent diameter $\phi e_3$. The channels $C_3$ all possess an identical hydraulic diameter $h_3$. All of the channels $C_3$ are identical in profile or shape. Nevertheless, the shape of the section of the channels $C_3$ differs from the shape of the right cross-section of the channels in the first and second categories. Like the channels $C_1$ and $C_2$, according to the invention the channels $C_3$ in the third category must satisfy the following requirements:

the area of the right cross-section $S_3$ is substantially identical to the areas of the right cross-sections of the channels $C_1$ and $C_2$;

the hydraulic diameter $\phi h_3$ is substantially identical in value to the hydraulic diameters of the channels $C_1$ and $C_2$; and the equivalent diameter $\phi e_3$ is such that the ratio of equivalent diameter $\phi e_3$ over hydraulic diameter $\phi h_3$ is less than or equal to 2.

As explained above, the area $S_3$ of the cross-section of the channels $C_3$ is considered as being substantially identical to the cross-sectional areas of the channels $C_1$ and $C_2$ providing the ratios of the areas when taken in pairs, i.e. $S_3/S_1$ (or $S_1/S_3$) and $S_3/S_2$ (or $S_2/S_3$) lie in the range 0.75 to 1.3, and preferably in the range 0.95 to 1.05. Similarly, the hydraulic diameter $\phi h_3$ of the channels $C_3$ of the second category is considered as being substantially equal to the hydraulic diameters of the channels $C_1$ and $C_2$ providing the ratios of the hydraulic diameters taken in pairs, i.e. $\phi h_3/\phi h_1$ (or $\phi h_1/\phi h_3$) and $\phi h_3/\phi h_2$ (or $\phi h_2/\phi h_3$) lie in the range 0.75 to 1.3, and preferably in the range 0.95 to 1.05.

In the example shown, the third category $I_3$ comprises a single channel $C_3$ whose right cross-section includes the central axis A of the element. The central channel $C_3$ preferably, but not exclusively, has a right cross-section that is circular and centered on the central axis A. For example, the channel $C_3$ has a right cross-section of area $S_3=10.17$ mm$^2$, a hydraulic diameter $\phi h_3=3.6$ mm, and an equivalent diameter $\phi e_3=3.6$ mm. It follows that the ratios of the areas of the right cross-sections $S_1/S_3=1.17$ or $S_3/S_1=0.84$ and $S_2/S_3=0.98$ or $S_3/S_2=1.02$ which are all within the range 0.75 to 1.3. Similarly, the ratios of the hydraulic diameter of the channel $C_3$ to those of the channels $C_1$ and $C_2$ are such that $\phi h_1/\phi h_3=0.97$ (or $\phi h_3/\phi h_1)=1.02$) and $\phi h_2/\phi h_3=0.97$ (or $\phi h_3/\phi h_2=1.02$). These ratios lie within the range 0.75 to 1.3. Finally, the ratio $\phi e_3/\phi h_3=1$ which is indeed less than 2.

As can be seen from the above description, the invention applies to any filter element whose channels $C_n$ can be classified in n categories $I_1, I_2, I_3, \ldots, I_n$, where $n \geq 2$, such that within each category all of the channels have identical cross-sectional area $S_n$ and identical hydraulic diameter $\phi h_n$, with the shapes of the right cross-sections of the channels differing between categories of channels.

In the general case of a filter element comprising n categories of channels, the channels of the various categories have cross-sectional areas and hydraulic diameters that are substantially identical insofar as firstly the ratios between any two cross-sectional areas and secondly the ratios between any two hydraulic diameters lie in the above-specified ranges, i.e. 0.75 to 1.3 and preferably 0.95 to 1.05. In addition, the ratio of equivalent diameter over hydraulic diameter for each channel must be less than or equal to 2. Satisfying these three conditions makes it possible to optimize the ratio of filter area over volume for the porous support used, while still making it possible to obtain uniform unclogging in all of the channels and avoiding the channels becoming blocked by the fluid to be treated.

In the example shown, it should be observed that the channels are made in such a manner that the categories to which they belong are organized concentrically. It should naturally be understood that the channels could be organized so as to occupy arbitrary positions that do not correspond to a determined distribution of channel categories.

In the example shown in FIG. 1, the first, second and third categories $I_1$, $I_2$, and $I_3$ respectively comprise 16, 6, and 1 channels $C_1$, $C_2$, and $C_3$. Naturally, each of these categories could have some other number of channels. Similarly, the profiles of the channels $C_1$, $C_2$, and $C_3$ could be different while satisfying the above-specified characteristics. In the example shown in FIG. 1, the filter element is provided with a central channel $C_3$ serving to avoid problems of matter accumulating in a volume which is never swept by liquids, and in particular is never swept by cleaning liquids. Such a channel serves to avoid problems of bacteria proliferating and enables the central volume to be cleaned by means of cleaning liquids. For example the element 1 is more particularly adapted to filtering viscous fluids. In the example shown in FIG. 1, the filter element has an outside diameter of 25 mm. It is clear that the invention can also be applied to filter elements having a different outside diameter, e.g. equal to 10 mm and including a different number of categories of channel.

Figure 2:
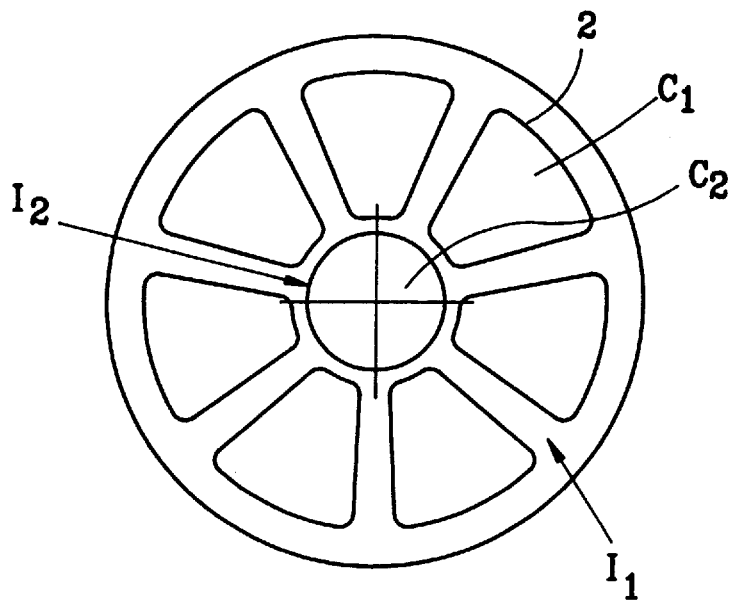
FIG. 2 is a cross-section through another embodiment of a filter element.

FIG. 2 shows another embodiment of the invention in which the first category $I_1$ of channels has seven channels $C_1$ while the second category $I_2$ has a single channel $C_2$. The cross-sectional area $S_1$ of all of the channels $C_1$ in the first category $I_1$ is substantially identical to the area $S_2$ of the section of the channel $C_2$. For example, the areas $S_1$ and $S_2$ are respectively equal to 34 mm$^2$ and 33 mm$^2$. The ratio $S_1/S_2=1.03$ (or $S_2/S_1=0.97$) which is within the above-defined range.

In this example, the hydraulic diameter $\phi h_1$ of the channels of the first category $I_1$ is substantially equal to the hydraulic diameter $\phi h_2$ of the channel $C_2$ of the second category $I_2$. For example, the hydraulic diameter $\phi h_1$ is equal to 6 mm while the hydraulic diameter $\phi h_2$ is equal to 6.5 mm. The ratio $\phi h_1/\phi h_2=0.92$ (or $\phi h_2/\phi h_3=1.08$) lies within the above-defined range. In addition, the ratio of equivalent diameter over hydraulic diameter or each of the channels C1 and $C_2$ is equal respectively to 1.09 and 1, i.e. $\leq 2$, with $\phi e_1=6.58$ mm and $\phi e_2=6.5$ mm.

The invention is not limited to the examples described and shown since various modifications can be made thereto without going beyond the ambit of the invention.

We claim:

1. An inorganic filter element for filtering a fluid medium in order to recover a filtrate, the element comprising:

a rigid inorganic porous support of cylindrical shape having a longitudinal central axis; and channels formed in the support parallel to its central axis and each having its surface covered by at least one separator layer for coming into contact with the fluid medium, said channels being classifiable in $\underline{n}$ categories where $n \geq 2$, with all of the channels in each category having identical cross-sectional area, identical hydraulic diameter, and identical equivalent diameter, the shapes of the right cross-sections of the channels differing between categories;

wherein the channels of the various categories have:

hydraulic diameters such that the ratios between any two hydraulic diameters lie within the range 0.75 to 1.3;

right cross-sectional areas such that the ratios between any two right cross-sectional areas lie in the range 0.75 to 1.3; and equivalent diameters such that the ratio of the equivalent diameter over the hydraulic diameter for each channel is less than or equal to 2.

2. A filter element according to claim 1, wherein the channels of the various categories have right cross-sections such that the ratios of the right cross-sectional areas taken in pairs all lie in the range 0.95 to 1.05.

3. A filter element according to claim 1, wherein the channels of the various categories present hydraulic diameters such that the ratios of the hydraulic diameters taken in pairs all lie in the range 0.95 to 1.05.

4. A filter element according to claim 1, wherein one of the categories of channels comprises a single channel whose right cross-section includes the central axis of the porous support.

5. A filter element according to claim 4, wherein the channel whose right cross-section includes the central axis of the support is centered on said axis.

6. A filter element according to claim 5, wherein the centered channel is of circular right cross-section.

* * * * *